United States Patent

Dubois et al.

Patent Number: 5,966,227
Date of Patent: Oct. 12, 1999

[54] ACTIVE COOPERATIVE TUNED IDENTIFICATION FRIEND OR FOE (ACTIFF)

[75] Inventors: Jacques Dubois, Neufchatel; Sophie La Rochelle, Cap-Rouge, both of Canada

[73] Assignee: Her Majesty the Queen in right of Canada, as represented by the Minister of National Defence, Ottawa, Canada

[21] Appl. No.: 08/926,437

[22] Filed: Sep. 10, 1997

[30] Foreign Application Priority Data

Nov. 1, 1996 [CA] Canada ................. 2 189 377

[51] Int. Cl.$^6$ ................. H04B 10/00
[52] U.S. Cl. ................. 359/170; 342/45
[58] Field of Search ................. 359/169–170, 359/155, 152, 160; 342/45; 250/226

[56] References Cited

U.S. PATENT DOCUMENTS

| | | | |
|---|---|---|---|
| 3,721,950 | 3/1973 | Jorgensen | 340/3 E |
| 3,989,942 | 11/1976 | Waddoups | 250/199 |
| 4,064,434 | 12/1977 | Waksberg | 359/170 |
| 4,134,008 | 1/1979 | Corlieu et al. | 250/199 |
| 4,143,263 | 3/1979 | Eichweber | 250/199 |
| 4,249,265 | 2/1981 | Coester | 455/604 |
| 4,361,911 | 11/1982 | Buser et al. | 455/605 |
| 4,694,297 | 9/1987 | Sewards | 342/45 |
| 4,731,879 | 3/1988 | Sepp et al. | 455/605 |
| 4,763,361 | 8/1988 | Honeycutt et al. | 455/605 |
| 4,851,849 | 7/1989 | Albersdoerfer | 342/43 |
| 5,001,488 | 3/1991 | Joguet | 359/155 |
| 5,274,379 | 12/1993 | Carbonneau et al. | 342/45 |
| 5,317,442 | 5/1994 | Sharp et al. | 359/170 |
| 5,434,668 | 7/1995 | Wootton et al. | 359/170 |
| 5,686,722 | 11/1997 | Dubois et al. | 342/45 |

*Primary Examiner*—Kinfe-Michael Negash
*Attorney, Agent, or Firm*—Larson & Taylor

[57] ABSTRACT

An optical identification friend-or-foe (IFF) system for vehicles comprises an active cooperative identification friend-or-foe (ACTIFF) system wherein a responder optical head is located on each friendly vehicle. That responder optical head comprises a number of small panels arranged in an array with surfaces of adjacent panels being at an angle to each other, the outer surfaces of the panels being coated with laser paint designed to emit radiation at one or more selective wavelengths when subjected to a suitable interrogation pump beam. Those selective wavelengths form an identification code for a vehicle. In operation, an interrogating vehicle would transmit a narrow well-collimated infrared (IR) beam towards a target vehicle causing laser paint on the coated surfaces to emit the selective wavelengths when subjected to that IR beam. These wavelengths can then be detected by the interrogating vehicle for identification purposes.

20 Claims, 3 Drawing Sheets

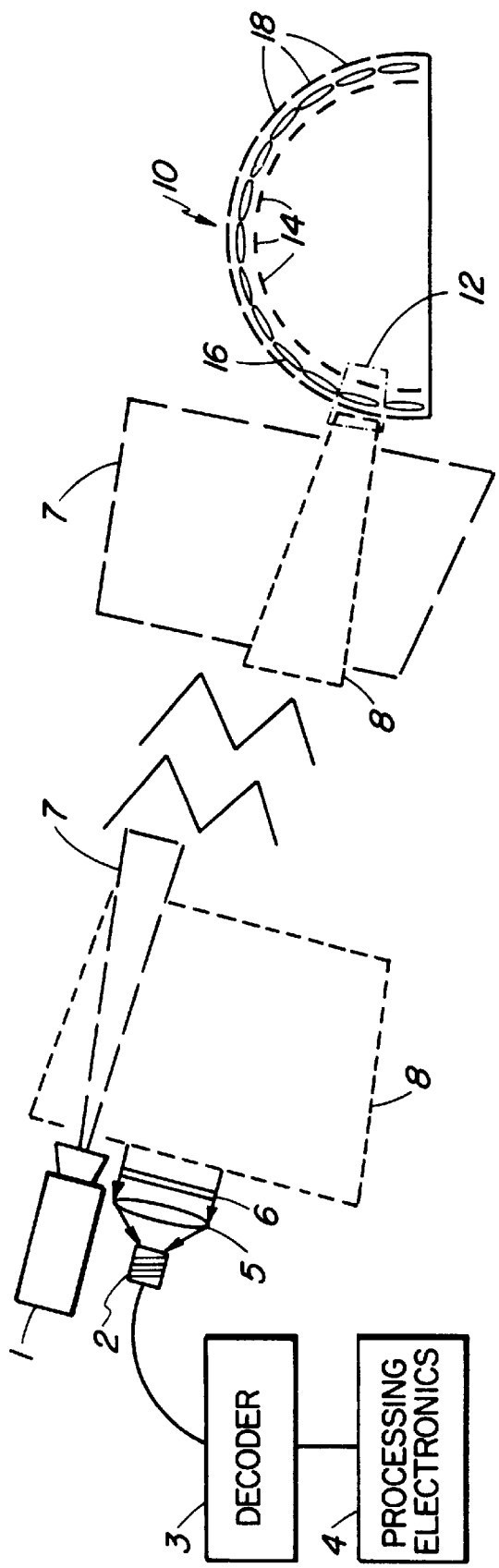
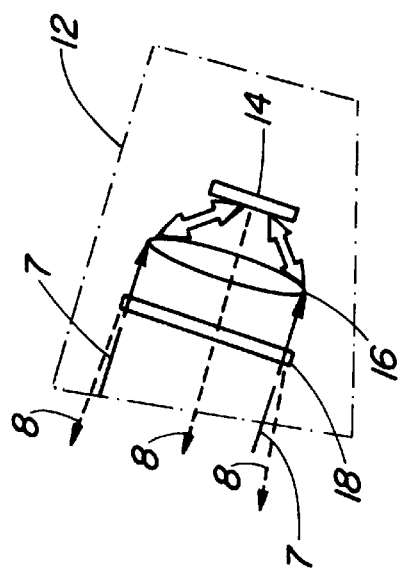
FIG. 1
FIG. 1A

ACTIVE COOPERATIVE TUNED IDENTIFICATION FRIEND OR FOE (ACTIFF)

FIELD OF THE INVENTION

The invention relates to optical identification friend-or-foe (IFF) systems and in particular to active cooperative identification friend-or-foe (ACTIFF) systems in which a laser transmitter on an interrogating vehicle transmits a narrow interrogating laser beam towards a target vehicle that, in the case a friendly target, would be equipped with a responder optical head that retroreflects energy from the interrogating beam back to the interrogating vehicle at a different wavelength from that of the interrogating beam, the interrogating vehicle having a narrow field-of-view detector for detecting the retroreflected energy in order to identify target vehicles as being a friend or a foe if retroreflected energy at predetermined wavelengths is not detected.

BACKGROUND OF THE INVENTION

One of the problems that face military platform commanders on a modern battlefield is to positively identify potential targets as being friend-or-foe when one is detected which is within range of a commander's weapon systems. That identification of friend-or-foe targets presents a very difficult decision for a commander of a military platform, such as a tank, who must decide in a split-second as to whether or not a detected target should be engaged while, at the same time, attempting to minimize any possibility of fratricide killing. This problem is rendered even more complex by the proliferation of military equipment which could result in possible conflicts between nations using similar military platforms. Therefore, visual assessments of potential targets is no longer a reliable method of identification for military platforms. Furthermore, technical advances have increased the range and accuracy of weapon systems which increases the difficulty of accurately identifying targets. That difficulty increases with distance, particularly distances which are located near the edge of useful ranges for current identification aids. This problem also exists for air-to-ground combat scenarios as well as ground-to-ground engagements.

No current systems exist which provide reliable, rapid and positive friend-or-foe identification for military platforms on modern land battlefields. Commanders often still rely on low-resolution visual and infrared images to determine if detected targets, be they tanks or other support vehicles, are enemy ones or not. That information may possibly be supported by information derived from a radio network. However, this is not always possible since commanders often have to operate under radio silence in order to avoid being detected by an enemy. In the case of infrared (IR) imagers, the identification of land vehicles is not straight forward even with the most sophisticated thermal viewers. The IR signatures of land vehicles observed by these type of thermal viewers are dependent, to a very large degree, on uncontrollable factors such as the time a vehicle's engine has been running, the time a vehicle has been exposed to direct sunlight, etc. These factors make it difficult to determine if the observed IR signature from a vehicle is that of a friend-or-foe military platform.

Several different types of systems have been previously proposed to perform identification friend-or-foe (IFF) functions, most of which are based on radar or radio technology and a few on electro-optical technology. However, none of these systems have managed to satisfactorily meet the reliability requirements necessary for the type of operations envisaged while, at the same time, remaining covert and secure from observation by enemy forces. Among known IFF systems, some are purely passive and just provide distinctive passive features for interrogation vehicles to identify while others are considered to be active since they have to emit a signal to provide adequate identification. These active IFF systems can be based on a transponder that emits a signal which should only be detectable by a friendly platform and may also involve an interrogator and responder for each platform in order to perform active cooperative identification.

One known IFF technique is for a vehicle to carry a transponder that emits a coded return signal when an interrogating radar pulse is detected by its receiver. U.S. Pat. No. 4,851,849 by Otto Albersdoerfer describes one such active system while another type of IFF system, one which does not require an active transponder, is described in U.S. Pat. No. 4,694,297 by Alan Sewards. The IFF system described in U.S.Pat. No. 4,694,297 only requires an antenna on a target vehicle which can re-radiate or reflect a radar beam and modulate that re-radiated beam in a distinctive manner. This latter system is based on the idea that an illuminating radar source would only detect a small reflected signal from a good antenna which is terminated in a matched load. However, all of the energy intercepted by that antenna will be re-radiated when the antenna terminating impedance provides a short circuit. A substantial reflected signal would then be created which could be detected by the source of the illuminating radar beam. Therefore, an antenna on a target vehicle with a variable termination impedance can modulate a re-radiated radar beam back to the radar source and, as a result, provide an identification signal to the source with that passively reflected radar beam being modulated with the code of the day.

One type of active cooperative electro-optical IFF system is described in U.S. Pat. No. 4,143,263 by K. Eichweber. This system consists of a number of retroreflectors arranged in a circular pattern to obtain omnidirection reception of any interrogating laser beam with a modulator connected in front of each retroreflector. That modulator, for example a liquid crystal, is normally kept in an opaque blocking state and only opened after a coded signal of an interrogating beam has been picked up by a parallel sensor and been decoded to verify it as being a friendly signal. When the modulator is open, the interrogating laser beam is retroreflected back to its source. By varying the light transmittancy of the modulator to selectively mask and unmask the associated retroreflector, an identification coded signal can be added to the retroreflected laser beam to identify the receiver of the interrogating laser beam to the source of that beam.

Another active cooperative electro-optical IFF system is described in U.S. Pat. No. 5,274,379 by R. Carbonneau et al. In this system, each friendly vehicle is provided with a narrow-beam laser transmitter and a receiver with a panoramic detector for a transmitted coded laser beam originating from an interrogating vehicle. If a vehicle detects a coded interrogating laser beam and identifies the code transmitted as being from a friendly source, it provides an unblocking signal to a blocking means surrounding a rotating retro-reflector to clear a transmission path so that the retro-reflector will reflect the interrogating laser beam back to the source where it can be identified by a narrow field-of-view detector of the interrogator. A further modulation is added to the reflected beam to identify the interrogated vehicle as being friendly. If a laser beam is detected from a source without a valid code being identified, the blocking means does not clear the transmission path preventing reflection of that beam by the retro-reflector and a warning is sent to the commander of the vehicle that an unfriendly laser transmission has been detected by the vehicle. Both U.S. Pat. No. 4,143,263 and 5,274,379 reflect an interrogating laser beam back towards the source while adding a further code to the reflected beam.

SUMMARY OF THE INVENTION

It is an object of the present invention to provide an Active Cooperative Tuned Identification Friend-or-Foe (ACTIFF) system for vehicles based on the use of a responder optical head emitting a selective wavelength coded identification signal to any interrogating vehicle that projects an interrogation beam of suitable wavelength onto that responder optical head.

An active cooperative optical identification friend-or-foe system for vehicles according to one embodiment of the present invention comprises a responder optical head mounted on vehicles wherein the responder optical head comprises a number of flat surfaces coated with laser paint which surfaces are arranged at an angle to each other with their coated surfaces facing outward, that laser paint being designed to emit radiation at one or more selective wavelengths when subjected to a suitable infrared (IR) pump beam of a different wavelength, the selective wavelengths forming an identification code for a vehicle on which the optical head is mounted.

An active cooperative optical identification friend-or-foe system for vehicles according to a further embodiment of the invention comprises a responder optical head mounted on vehicles wherein the responder optical head comprises a number of small panels arranged in an array with surfaces of adjacent panels being at an angle to each other, outer surface of the panels being coated with laser paint designed to emit radiation at one or more selective wavelengths when subjected to a suitable interrogation pump beam of a different wavelength, the selective wavelengths forming an identification code for a vehicle on which the optical head is mounted. In one particular embodiment, the array of panels forms a hemisphere and, in a preferred embodiment, each panel is coupled to a lens arranged to focus the pump beam onto the outer surface of that panel.

BRIEF DESCRIPTION OF THE DRAWINGS

The following detailed description of the invention will be more readily understood when considered in conjunction with the accompanying drawings, in which:

FIG. 1 is a block diagram that illustrates an Active Cooperative Tuned Identification Friend-or-Foe (ACTIFF) system according to one embodiment of the present invention, FIG. 1a is an enlarged cross-sectional view of one of the optical elements which are arranged in an array to form the responder optical head illustrated in FIG. 1.

DESCRIPTION OF THE PREFERRED EMBODIMENTS

Figures 2, 2A:
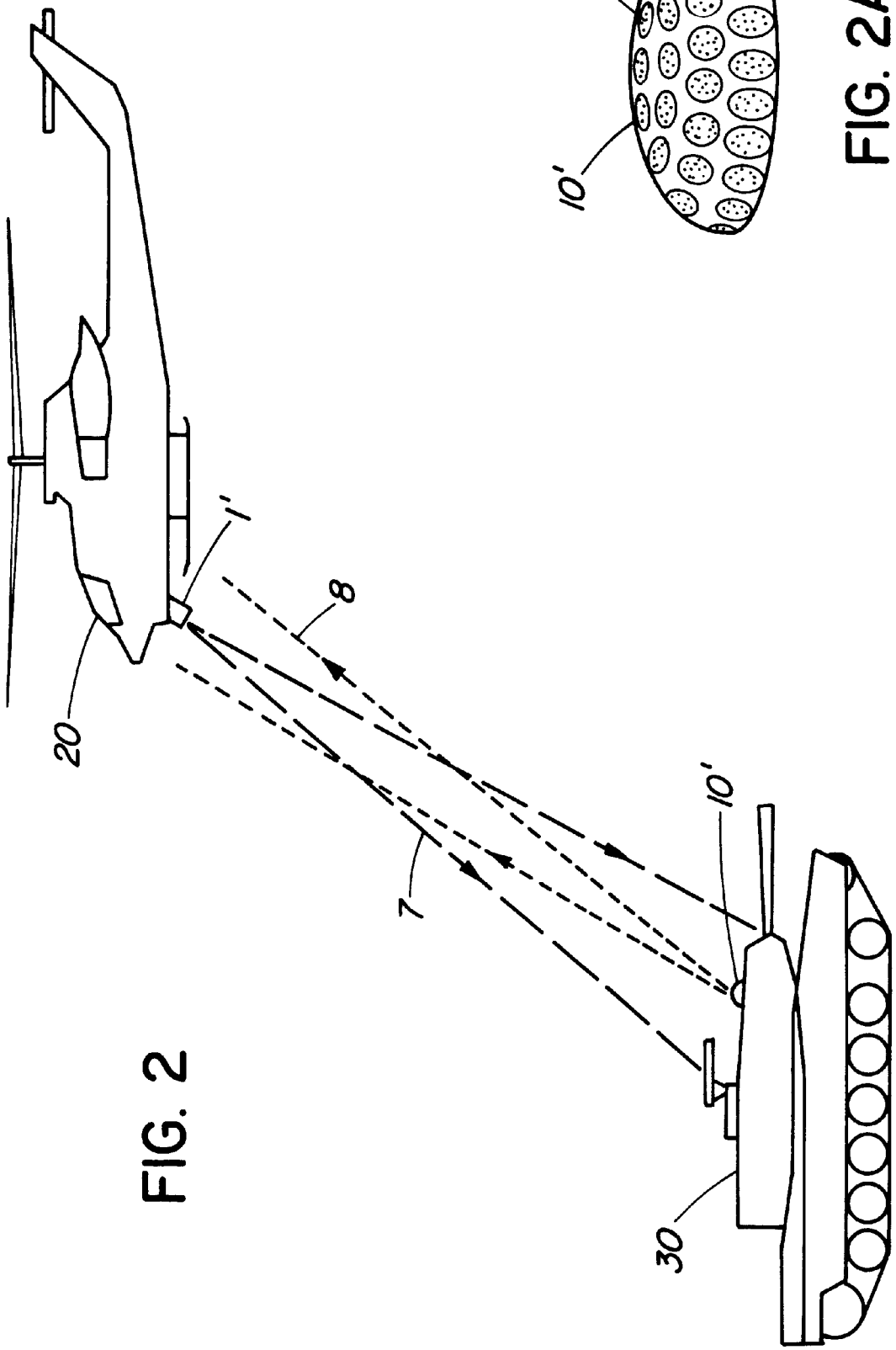
FIG. 2 illustrates the operation of an ACTIFF system according to a further embodiment of the invention.
FIG. 2a is an enlarged view of the responder optical head which is mounted on the turret of a tank shown in FIG. 2.

An Active Cooperative Tuned Identification Friend-or-Foe (ACTIFF) system for military platforms according to one embodiment of the present invention is illustrated in the block diagram of FIG. 1. The type of system described herein is particularly directed to military vehicles. However, it could be used in other areas such as in search and rescue applications when vehicles are involved which are provided with similar types of optical responders.

The basic ACTIFF system, such as the one illustrated in FIG. 1, consists of an interrogating vehicle provided with an interrogation means 1 and at least one responder means 10 mounted on a target vehicle. The interrogation means comprises an infrared (IR) laser transmitter 1 installed on the interrogating vehicle which could possibly be integrated into their laser rangefinder optical systems. That laser transmitter 1 can project a well collimated coded narrow IR interrogation beam 7 towards a target vehicle that would only irradiate the target vehicle area. In addition, each interrogating vehicle requires a narrow field-of-view (FOV) detecting system 2 that is aimed in the same direction as the interrogating beam and which is designed to detect any emissions from an optical responder head 10 mounted on friendly vehicles. Those emissions would be at a selective wavelength or wavelengths which differ from the wavelength of an interrogating beam. If the target vehicle is unfriendly and/or not equipped with a proper responder optical head, only a diffuse reflection of the transmitted energy of the interrogating beam will be reflected back to the interrogating vehicle. If this is the case, that diffuse retroreflected energy would be at the same wavelength as the interrogation beam.

Each friendly target vehicle would be required to be provided with at least one responder to any interrogation beam, such as the hemispherical responder optical head 10 shown in FIG. 1. This particular optical head is formed by an array of many small panels 14 with flat surfaces arranged at various angles to each other to create a hemisphere. These panels 14 are coated with a laser paint, at least those surfaces facing outward from the array, or a combination of laser paints. This laser paint or combination of paints have the ability to absorb energy of an IR interrogation beam and, if that beam is of an adequate wavelength to act as a pump beam, create some laser emissions which can be detected by the narrow FOV detection system 2 of an interrogating vehicle. The laser emissions from these laser paints will be at a different wavelength or wavelengths from that of the interrogated beam and can be easily differentiated from any diffuse retroreflections of that beam. Furthermore, the emissions from these type of laser paints would stand out strongly above the background because the responder head is the only object in the area of the target vehicle that is capable of producing a strong retroreflection of energy at those particular wavelengths.

The laser paints presently available on the market have been produced in solid, liquid, porous and gel forms. The precise emission wavelength of these paint materials can be tuned in nanometre steps by adjusting the pH of the host matrix or by chromophore engineering of the dyes. This provides a means to identify a target vehicle on which a responder optical head is mounted since the emissions of laser paints on the coated surfaces can be tuned to a selective wavelength or combination of wavelengths which make up a code of the day for identification purposes.

Those selective wavelengths which are emitted by the coating, or coatings, would be detectable by a narrow FOV detector 2 of an interrogating vehicle. A detector or CCD camera tuned at the right wavelengths would pick up the emissions for these coatings. Signals from that detector are applied to a decoder 3 in order to identify if any retroreflected energy contains the known wavelengths which form the code of the day. Diffuse retroreflected energy at the wavelength of the interrogating beam 7 could be removed by an optical filter 6 located in front of a lens 5 that focuses retroreflected energy onto detector 2. If the particular selective wavelengths of the code of the day are detected and identified by decoder 3 and processing electronics 4, then the processing electronics 4 will immediately notify the interrogating vehicle's commander that a friendly target is being interrogated. If the target is unfriendly and/or not equipped with a suitable responder only a diffuse reflection of the transmitted energy of the interrogating beam 7 will be reflected back to the interrogating vehicle and no code of the day will be able to be identified.

Each of the flat panels 14 shown in the FIG. 1 embodiment is coupled to a lens 16 and optical filter 18. The combination of a filter 18, lens 16 and flat panel 14 form an element 12 whose cross-section is shown in enlarged detail in FIG. 1a. The elements 12 are connected together in an array that is shaped as hemisphere 10 with the filters 18 forming the outer surface of that hemisphere. These optical filters 18 are transmissive for both the wavelength of an interrogating laser beam 7 and the wavelengths that can be emitted from the laser paint coating.

When small lenses 16 are provided in front of panels 14, as shown in FIG. 1A, those that face an arriving interrogating IR beam will focus that beam onto a portion of the associated small panel 14 which has been coated with a desired laser paint. That laser beam 7 acts as a pump beam and the lenses will concentrate the incoming laser energy of beam 7 at the associated panels to a level which reaches and exceeds the laser emission thresholds for the laser paint coatings on those panels. Any laser emissions from those coatings will be collected by those lenses and sent back in the same direction as that of the arriving beam 7. This will form a retroreflected energy beam 8 at the wavelengths of emission from the coatings which can be detected by the narrow FOV detector 2, or detectors, of an interrogating vehicle. The lenses 16, therefore also provide the desired collimation and orientation to the retroreflected energy beam 8 so that it is directed towards the narrow FOV detector 2, or detectors, to aid in the identification process.

The retroreflected energy beam 8 at the new wavelength (s) can be detected by a narrow FOV detector (or detectors) of an interrogation vehicle which is (are) optically tuned at this (these) wavelength(s) by the use of narrow band optical filter(s) 6. Those selective wavelength(s) which are passed by the filter(s) form a code of the day for identification purposes. Signals from detector 2 are applied to a decoder 3 and processing electronics 4 to determined if any emitted wavelength(s) from a responder optical head 10 correspond to that of a known code of the day. If the emissions which form a retroreflected beam 8 correspond to a known code of the day, a warning is immediately sent by the processing electronics 4 to the interrogating vehicle's commander that a friendly target is being interrogated. The commander can then take steps to stop any engagement of that target. The processing electronics might also block the interrogating vehicle's weapon system from engaging a target when that target is identified as being friendly due to a known code of the day being identified.

An identification friend-or-foe (IFF) system according to the present invention assumes that each friendly military platform is equipped with a suitable responder optical head according to an ACTIFF system described herein. This ACTIFF system operates in the following manner which is illustrated in FIG. 2. The operator of a military platform, in this case a helicopter 20, will first activate a laser interrogation transmitter 1'when a potential target, such as tank 30, is to be engaged. That IR laser transmitter 1'will then project a narrow, well collimated, coded laser beam 7 towards that target tank 30. This narrow laser beam will only irradiate the target vehicle area and may form part of the same system as a laser range finder. That IR laser transmitter 1'could be a solid state laser transmitter producing a well collimated laser beam and, preferably, operating at an eyesafe wavelength of around 1.55 $\mu$m. The interrogating helicopter 20 will also require a narrow FOV detection system (not shown) aimed in the same direction as beam 7. This narrow FOV detection system would be similar to that described with respect to FIG. 1. The detection system could share the same optics as the laser transmitter by using a beam splitter for that purpose or it may have its own optics of conventional design. The 1.06 $\mu$m. laser range finder source with its narrow FOV detection that are already integrated into several weapons could, however, also be used as an interrogator and detector with considerable cost reduction. The optical head 10'shown as mounted on the turret of tank 30 will retroreflect energy of the interrogating beam 7 at the new wavelengths of emissions from laser paint coatings in the optical head 10'. Those emissions from optical 10', at least when lenses 16 as in FIG. 1A are used, will be directed as a beam 8 back towards the interrogator where they can be detected by the NOV detector and a code of the day, i.e. the selective wavelengths, identified.

The responder optical head (10 or 10') can be built along many different shapes ranging from a number of flat surfaces coated with laser paint arranged at various angles to each other to complex shapes like a hemisphere as shown in FIG. 1 (item 10) or FIG. 2A or a sphere depending on the field of view to be covered. A responder with a number of flat surfaces coated with laser paint mounted at various angles to each other on vehicles would be sufficient for search and rescue operations. However, IFF applications would require at least a hemispherical responder optical head in order to provide a panoramic retroreflection capability. The lenses, when used, perform dual purposes by both concentrating the interrogating laser beam onto a surface coated with laser paint and then providing the desired collimation and orientation to the retroreflected energy emissions from the laser paint. A number of lens array are available on the market in spherical or cylindrical shapes with individual lens diameter that can be as low as tens of micrometers. FIG. 2A illustrates one such lens array 10', with lens 16', which is shaped as a hemisphere. Optical filters, such as 18 shown in FIG. 1, can be placed in the front of these lenses to restrict transmission to the laser wavelengths that may be used as a pump beam and the response emissions wavelengths from the laser paint. These optical filters would also avoid possible degradation of the laser paint due to exposure to the sun or other light sources.

In a preferred embodiment of the invention for IFF purposes, the interrogating laser beam 7 shown in FIG. 2 would be coded (possibly pulse coded) and this coded interrogation beam would be detected and analyzed by a panoramic detector on friendly vehicles such as the one described in U.S. Pat. No. 5,274,379. The responder optical head for this system would normally be protected by some kind of mechanical or electro-optical shutter that would only clear an optical path to the responder after the validation of the interrogation code from the interrogation source 20. The responder optical head would, therefore, only provide a response after the interrogation source has been identified as being friendly. This type of system will optimize the security and covertness of an IFF interrogation and response arrangement.

Figure 3:
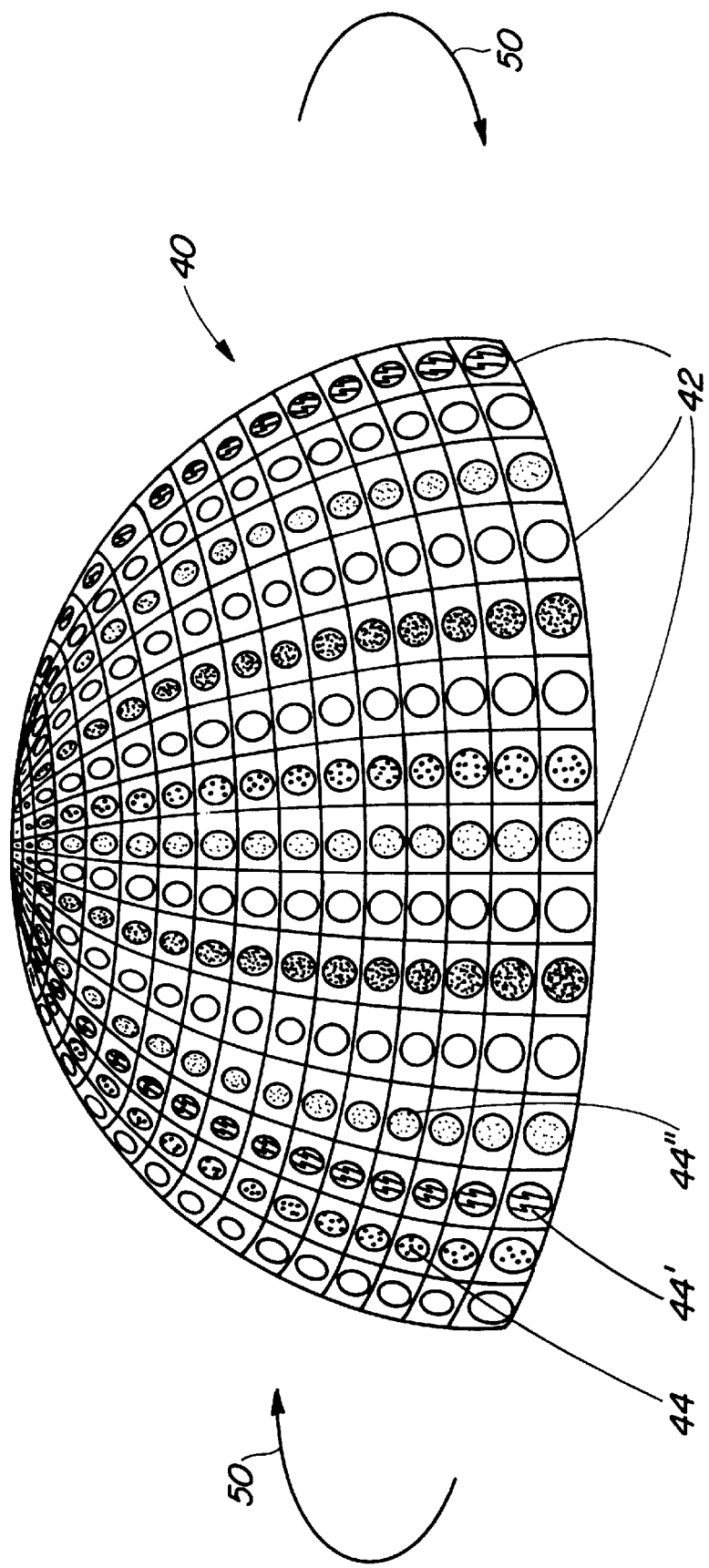
FIG. 3 illustrates another responder optical head according to a still further embodiment of the present invention.

FIG. 3 illustrates a more skillful embodiment of the invention wherein a responder optical head 40 can be rotated, as shown by arrows 50, to obtain a modulation of the retroreflected laser beam 8 (see FIG. 2). That rotation could be in either direction. Since the laser paint is easily tunable by adjusting the pH of the host matrix, it is possible to use several types of laser paints which emit at different wavelengths on the same rotating responder head. It would then be possible, as illustrated in FIG. 3, to divide a hemispheric responder head into a series of vertical sectors with each adjacent sector containing panels (44, 44', 44'', etc.) coated with a different type of laser paint that provide lasing at different specific wavelengths. The rotation of the responder head 40 would then successively expose the various sectors to an interrogating laser beam which will then generate a color coded retroreflection beam. The narrow FOV detector of the interrogator would then detect this color coded return beam and analyze it for validation. The narrow FOV detector for the color coded return beam in this type of operation will have to be able to detect in several narrow optical bands at the same time. Those narrow optical bands would correspond to the various possible lasing wavelengths of the different laser paints on responder 40. This detection of several narrow optical bands can be easily achieved by using a series of small detectors fitted with suitable narrow bandwidth optical filters or by using a linear array of detectors coupled to a linearly variable optical filter. This latter approach allows for easily changing the detected narrow optical bands whenever the code of the day is changed for identification of friendly vehicles.

Although the invention has been described with reference to several specific embodiments of the inventions, various modifications may be made to those specific embodiments without departing from the spirit and scope of the invention as defined in the appended claims.

The embodiments of the invention in which an exclusive property or privilege is claimed are defined as follows:

1. A responder optical head to be mounted on vehicles for an identification friend-or-foe system, the optical head comprising a number of flat surfaces coated with a laser paint wherein the flat surfaces are arranged at an angle to each other with their coated surfaces facing outward, that laser paint being designed to emit radiation at one or more selective wavelengths when subjected to a suitable infrared (IR) pump beam of a different wavelength, the selective wavelengths forming an identification code for a vehicle on which the optical head is mounted.

2. A responder optical head to be mounted on vehicles for an identification friend-or-foe system, the responder optical head comprising a number of small panels arranged in an array with surfaces of adjacent panels being at an angle to each other, outer surface of the panels being coated with laser paint designed to emit radiation at one or more selective wavelengths when subjected to a suitable interrogation pump beam of a different wavelength, the selective wavelengths forming an identification code for a vehicle on which the optical head is mounted.

3. A responder optical head as defined in claim 2, wherein the array of panels forms a hemisphere.

4. A responder optical head as defined in claim 3, wherein a number of different laser paints designed to emit a number of selective wavelengths when subjected to a suitable pump beam form the coated surfaces on various panels.

5. A responder optical head as defined in claim 3, wherein each panel is coupled to a lens arranged to focus the pump beam onto the outer surface of that panel when that lens faces an arriving pump beam.

6. A responder optical head as defined in claim 5, wherein an optical filter is coupled to the lenses, said filter being transmissive to the wavelengths of the pump beam and the selective wavelengths.

7. A responder optical head as defined in claim 2, wherein each panel is coupled to a lens arranged to focus the pump beam onto the outer surface of that panel when that lens faces an arriving pump beam.

8. A responder optical head as defined in claim 7, wherein an optical filter is coupled to the lenses, said filter being transmissive to the wavelengths of the pump beam and the selective wavelengths.

9. A responder optical head as defined in claim 3, wherein the optical head is rotatable and the head is divided into a number of vertical sectors, the outer surfaces of the panels in each sector being coated with a laser paint designed to emit radiation at the same selective wavelengths with panels in adjacent sectors having outer surfaces coated with a different laser paint designed to emit radiation at different selective wavelengths.

10. A responder optical head as defined in claim 9, wherein each panel is coupled to a lens arranged to focus the pump beam onto the outer surface of that panel when that lens faces an arriving pump beam.

11. A responder optical head as defined in claim 10, wherein an optical filter is coupled to the lenses, said filter being transmissive to the wavelengths of the pump beam and the selective wavelengths.

12. An optical identification friend-or-foe system for vehicles, the system comprising a narrow beam interrogation means and a narrow field-of-view detection unit directed in the same direction as said narrow beam located on an interrogation vehicle and a responder optical head mounted on a target vehicle, the interrogation vehicle having means to direct the narrow beam toward a target vehicle with the detection unit having means to detect one or more selective wavelength emissions from the responder optical head on a target vehicle, which emissions form an identification code for the target vehicle; the optical head comprising a number of flat surfaces coated with laser paint wherein the flat surfaces are arranged at an angle to each other with their coated surfaces facing outward, the laser paint being designed to emit radiation at said one or more selective wavelengths when subjected to a suitable infrared (IR) pump beam, the narrow beam from the interrogation means forming said pump beam causing the optical head to emit said one or more selective wavelength emissions when irradiated with said narrow beam.

13. An optical identification friend-or-foe system for vehicles as defined in claim 12, wherein the narrow beam interrogation means is an infrared solid state laser coupled to an optical system designed to project a narrow well-collimated coded IR beam towards a target vehicle.

14. An optical identification friend-or-foe system for vehicles, as defined in claim 12, wherein the flat surfaces are small panels arranged in an array that form a hemisphere with surfaces of adjacent panels being at an angle to each other, outer surfaces of the panels being coated with laser paint designed to emit radiation at one or more selective wavelengths when subjected to a suitable pump beam, the narrow beam from the interrogation means forming said pump beam causing the optical head to emit said one or more selective wavelength emissions when irradiated with said narrow beam.

15. An optical identification friend-or-foe system for vehicles as defined in claim 14, wherein the narrow beam interrogation means is an infrared (IR) solid state laser coupled to an optical system designed to project a narrow well-collimated coded IR beam towards a target vehicle.

16. An optical identification friend-or-foe system as defined in claim 12, wherein a number of different laser paints designed to emit a number of selective wavelengths when subjected to a suitable pump beam form the coated surfaces on the flat surfaces.

17. An optical identification friend-or-foe system as defined in claim 12, wherein the flat surfaces are arranged in an array that form a hemisphere and the optical head is rotatable with the head being divided into a number of vertical sectors, the outer surfaces of the flat surfaces in each sector being coated with a laser paint designed to emit radiation at the same selective wavelengths with flat surfaces in adjacent sectors having outer surfaces coated with a different laser paint designed to emit radiation at different selective wavelengths.

18. An optical identification friend-or-foe system as defined in claim 14, wherein a number of different laser paints designed to emit a number of selective wavelengths when subjected to a suitable pump beam form the coated surfaces on various panels.

19. An optical identification friend-or-foe system as defined in claim 14, wherein the optical head is rotatable and the head is divided into a number of vertical sectors, the outer surfaces of the panels in each sector being coated with a laser paint designed to emit radiation at the same selective wavelengths with panels in adjacent sectors having outer surfaces coated with a different laser paint designed to emit radiation at different selective wavelengths.

20. An optical identification friend-or-foe system as defined in claim 15, wherein said responder optical head is surrounded by an optical shutter, the target vehicle having a panoramic detector for detecting said narrow well collimated coded IR beam from an interrogation vehicle and identifying an interrogation code of the coded IR beam, the panoramic detector having means to operate the optical shutter to clear an optical path to the responder optical head after validating a proper interrogation code that identifies the interrogation vehicle as friendly.

* * * * *